Feb. 3, 1970 K. CROFT 3,492,896
FACE CUTTING MACHINE
Filed Sept. 27, 1967
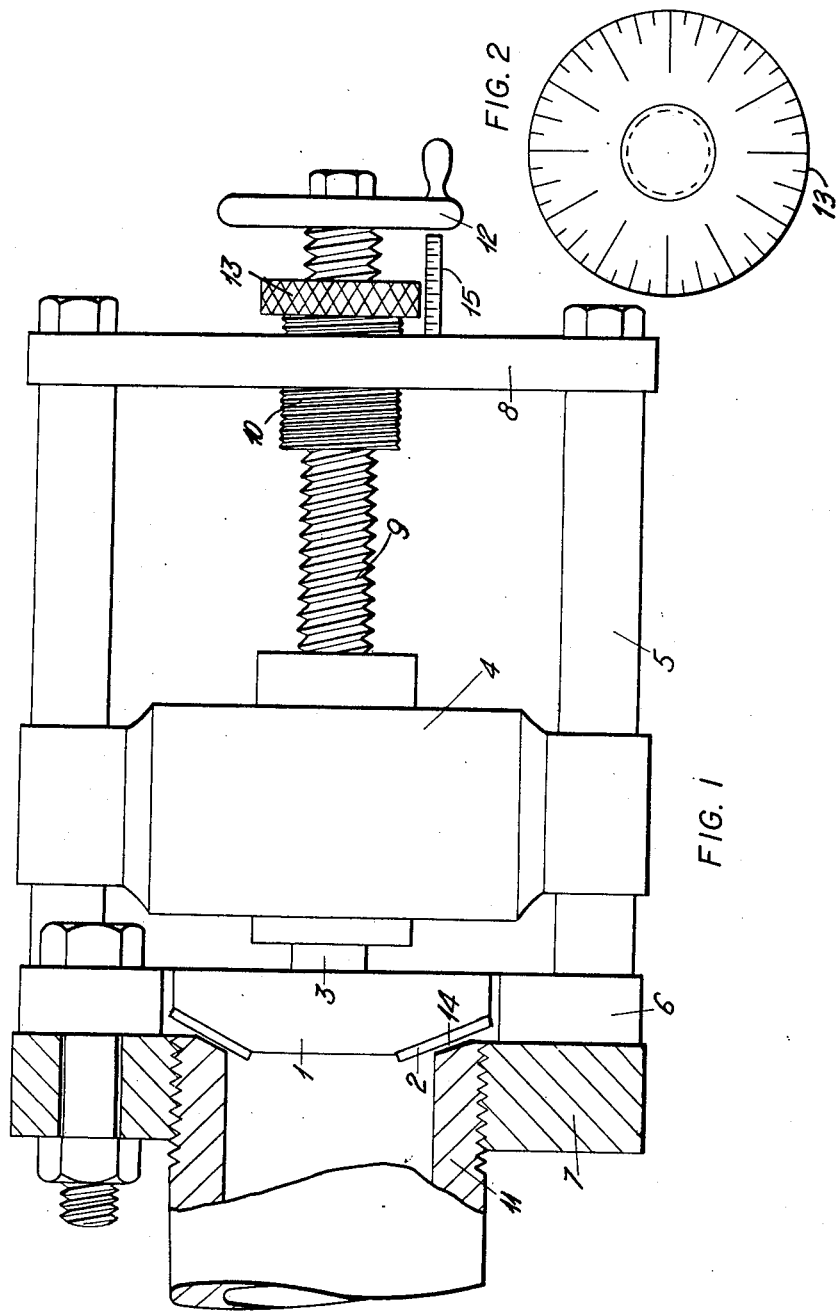
Inventor
KENNETH CROFT
By
Cushman, Darby & Cushman
Attorneys

United States Patent Office 3,492,896
Patented Feb. 3, 1970

3,492,896
FACE CUTTING MACHINE
Kenneth Croft, Norton-on-Tees, England, assignor to Imperial Chemical Industries Limited, Millbank, London, England, a corporation of Great Britain
Filed Sept. 27, 1967, Ser. No. 671,015
Claims priority, application Great Britain, Oct. 5, 1966, 44,486/66
Int. Cl. B23b *39/14;* B23c *1/20;* B23d *75/00*
U.S. Cl. 77—73                                                6 Claims

ABSTRACT OF THE DISCLOSURE

A portable machine for facing high pressure flanged pipe end faces consists of a frame which can be bolted on to the flange on which are mounted a cutting edge such as a number of replaceable tungsten carbide slips mounted in a steel backing plate and a motor for rotating the cutting edge against the face. Preferably coarse and fine adjusting screws are provided to bring the cutting edge into contact with the pipe face and to determine the depth of the cut.

---

The present invention relates to a face cutting machine, particularly to a portable pipe face cutting machine.

In the chemical industry many processes are conducted at high temperatures and pressures, for example pressures up to and in excess of 200 atmospheres and temperatures up to and above 300° C. The construction of plants in which to carry out such processes presents many problems, not least of which is the provision of a leak-proof union between two abutting lengths of pipes or between a pipe and a vessel. One suitable joint which may be used to effect such a union is that comprising a lens ring, i.e. an annular metal joint ring with spherical faces which is trapped between concave conical faces machined on the adjacent pipe ends, the pipes being bolted together by means of flanges. To provide an efficient seal both the concave faces of the pipe ends and the spherical faces of the lens ring must be free from surface imperfections. During service however surface defects are formed in the lens ring surface and/or in the pipe end faces through a variety of causes chief among which are corrosion and the development of a leak with subsequent erosion by the escaping fluid. To reform the joint the lens ring may be removed and its surface reground in a convenient workshop, the pipe end faces must however be reformed in situ as it is generally inconvenient or impossible to take away a pipe or vessel for machining.

One way in which the pipe end faces have been reconditioned is by use of a hand held power tool on which is mounted a wooden block bearing a layer of abrasive material on a conical face. By this means small surface imperfections may be smoothed out and removed. For deeper defects in the surface such as occur when the joint has been leaking this method is extremely laborious as it takes a very long time to remove more than a few thousandths of an inch of metal. The present invention concerns a machine which is portable and is able to recondition in a relatively short time a pipe face which is deeply marked.

According to the present invention a portable machine for facing high pressure flanged pipe end faces comprises a cutting edge, means for rotating the cutting edge against the pipe end face and means adapted to be attached to the pipe flange for positioning the cutting edge relative to the pipe face.

The cutting edge may be made of any material which is of the correct hardness. Tungsten carbide is very suitable and the cutting edge preferably comprises one or more replaceable slips of tungsten carbide suitably mounted e.g. in a steel backing plate. It is preferred that the cutting edge covers the full width of the joint face, and that the speed of rotation is sufficiently slow to remove metal from the face without chatter. The speed of rotation of the cutting edge is suitably about 11 r.p.m. and it is important that a good flow of lubricant be applied to the cutting edge and pipe face.

The cutting edge is rotated against the pipe end face by means such as a variable speed motor, particularly a compressed air motor in which the speed of rotation of the cutting edge may be controlled by adjusting the supply of air to the motor. The cutting edge is preferably mounted on a spindle, for example by means of the backing plate, the spindle being driven by the motor.

The pipe flanges are utilised to position the cutting edge relative to the pipe face. Thus the cutting edge and preferably the means for rotating the cutting edge are mounted on a frame which is constructed so that it may readily be attached to a pipe flange. Suitably the frame comprises an adaptor plate, which is capable of being bolted to the flange, on which are mounted a number of projecting columns, three being preferred, on which the cutting edge and rotating means are slidable.

It is advantageous for the machine of the present invention to be provided with adjustable means for introducing the cutting edge to the pipe face and for determining the depth of the cut. This may readily be achieved by use of a screw mechanism by operation of which the cutting edge is moved towards or away from the pipe face. Preferably a coarse adjustment is employed to introduce the cutting edge to the pipe face and a fine adjustment to determine the depth of the cut. It is also desirable to calibrate the fine adjustment so that the depth of the cut may be calculated. Both fine and coarse adjustments may be screws operable by hand. It is convenient that the adjustable means be mounted on the frame carrying the cutting edge and rotating means. Suitably the adjustable means, for example, a coarse and fine screw, is mounted on a plate in the columns referred to above.

As one of the advantages of the machine of the present invention is its portability the materials of construction should be chosen for lightness, provided that sufficient strength and rigidity are also achieved. Thus aluminum alloys are used as far as possible in the construction of the machine, for example for the motor gear box and adaptor plates, and the frame on which the cutting edge and other parts of the machine are assembled is made as light as possible, for example by making the projecting columns of tubular rather than solid construction.

The invention will now be further described with reference to the drawing in which FIGURE 1 is a section along the longitudinal axis of the machine in position on a pipe face and in which FIGURE 2 is a plan view of the fine adjusting screw of FIGURE 1.

The machine comprises a mild steel backing plate 1 on which are mounted three replaceable tungsten carbide slips 2. The backing plate is attached to a spindle 3 driven by the gearbox 4 of a variable speed air motor. The motor gearbox is slidably mounted on three tubular guide columns 5 which project outwards from an adaptor plate 6 bolted onto the pipe flange 7 formed on the pipe 11. Also mounted on the guide columns is a backing plate 8 which serves to support the coarse adjustment screw 9 and fine adjustment screw 10. The coarse adjustment screw is driven by a hand wheel 12 and the fine adjustment screw, which is calibrated, by a knurled nut 13.

In operation the adaptor plate 6 is bolted onto the pipe flange 7 as shown and the motor gear box 4 and the backing plate 8 are slid onto the guide columns 5. Operation of the coarse adjustment screw 9 brings the tungsten carbide slips 2 into contact with the concave pipe face 14. The motor is then started and the desired speed of rotation of the tungsten carbide slips set by controlling the air supply. As the metal face is cut away the slips are gradually moved forward by use of the fine adjustment screw until the required depth of cut has been achieved. A gauge 15 on the plate 8 together with calibration marks on the upper face of the fine adjusting screw indicates to the operator the extent of movement of the fine adjusting screw.

I claim:

1. A portable machine for facing a high pressure flanged pipe end face, said machine comprising: an adaptor plate adapted to be attached to the pipe flange, said adaptor plate carrying a plurality of guide columns extending parallel to the axis of the pipe; rotatable drive means mounted and slidably movable on said guide columns; a rotatable backing plate operatively connected to said rotatable drive means for movement therewith along said guide columns; at least one cutting bit carried by said rotatable backing plate; and means for adjusting the position of said drive means and backing plate along said guide columns, said adjusting means including a coarse adjusting screw for introducing the cutting bit to the pipe face and a fine adjusting screw for determining the depth of the cut.

2. The machine of claim 1 in which said fine adjusting screw is calibrated to enable calculation of the depth of the cut.

3. A machine as in claim 1 wherein one of said adjusting screws, threadedly engages a fixed support and wherein the other adjusting screw threadedly engages a threaded bore in said one screw and cooperates with said drive means to move the latter along said guide columns upon rotation of either screw.

4. A machine as in claim 3 wherein said fixed support is a plate fixed to said guide columns and wherein said one screw is said fine adjusting screw.

5. A machine as in claim 1 wherein said cutting bit is constructed of tungsten carbide.

6. A machine as in claim 1 wherein said drive means is a variable speed compressed air motor.

References Cited

UNITED STATES PATENTS

| | | | |
|---|---|---|---|
| 3,228,268 | 1/1966 | Strout | 77—73 |
| 3,141,365 | 7/1964 | Peters | 82—4.3 |
| 3,122,818 | 3/1964 | Nance | 77—73 XR |
| 3,069,819 | 12/1962 | Gilmore | 77—2 XR |
| 2,608,895 | 9/1952 | Culling | 82—4.3 |
| 1,676,414 | 7/1928 | Romano et al. | 90—12.5 |
| 1,534,908 | 4/1925 | Browder | 77—73.5 XR |
| 748,339 | 12/1903 | Bartrug | 90—12.5 XR |

FRANCIS S. HUSAR, Primary Examiner

U.S. Cl. X.R.

77—2; 90—12.5